United States Patent [19]

Smolarek

[11] Patent Number: 5,042,994

[45] Date of Patent: Aug. 27, 1991

[54] CONTROL OF PRESSURE SWING ADSORPTION OPERATIONS

[75] Inventor: James Smolarek, Boston, N.Y.

[73] Assignee: Union Carbide Industrial Gases Technology Corporation, Danbury, Conn.

[21] Appl. No.: 528,806

[22] Filed: May 25, 1990

[51] Int. Cl.⁵ .......................................... B01D 53/04
[52] U.S. Cl. .................................. 55/18; 55/26; 55/62; 55/68; 55/75; 55/179; 55/271; 55/389
[58] Field of Search .................. 55/18, 21, 25, 26, 58, 55/62, 68, 75, 161–163, 179, 180, 271, 389

[56] References Cited

U.S. PATENT DOCUMENTS

| | | | |
|---|---|---|---|
| 3,796,022 | 3/1974 | Simonet et al. | 55/25 |
| 4,140,495 | 2/1979 | Pietruszewski | 55/21 |
| 4,194,890 | 3/1980 | McCombs et al. | 55/18 |
| 4,234,322 | 11/1980 | DeMeyer et al. | 55/18 |
| 4,264,340 | 4/1981 | Sircar et al. | 55/25 |
| 4,315,759 | 2/1982 | Benkmann | 55/18 |
| 4,323,370 | 4/1982 | Leitgeb | 55/18 |
| 4,539,019 | 9/1985 | Koch | 55/21 |
| 4,576,614 | 3/1986 | Armond et al. | 55/18 |
| 4,643,743 | 2/1987 | Grader | 55/26 |
| 4,648,888 | 3/1987 | Rowland | 55/21 |
| 4,673,415 | 6/1987 | Stanford | 55/21 |
| 4,693,730 | 9/1987 | Miller et al. | 55/18 |
| 4,732,577 | 3/1988 | Koizumi et al. | 55/18 |
| 4,761,165 | 8/1988 | Stöcker et al. | 55/21 |
| 4,857,082 | 8/1989 | DiMartino, Sr. et al. | 55/21 X |
| 4,925,461 | 5/1990 | Gemba et al. | 55/26 |
| 4,927,434 | 5/1990 | Cordes et al. | 55/21 X |

FOREIGN PATENT DOCUMENTS

| | | | |
|---|---|---|---|
| 0250235 | 12/1987 | European Pat. Off. | 55/18 |
| 2922616 | 12/1980 | Fed. Rep. of Germany | 55/18 |
| 1-007001 | 2/1989 | Japan | 55/18 |
| 1-072908 | 3/1989 | Japan | 55/18 |
| 2003742 | 3/1979 | United Kingdom | 55/18 |

*Primary Examiner*—Robert Spitzer
*Attorney, Agent, or Firm*—Alvin H. Fritschler

[57] ABSTRACT

A pressure swing adsorption process and system for air separation includes a variable volume nitrogen product storage vessel, which is monitored to determine variations in user product demand. The processing cycle and individual processing steps are adjusted during periods of reduced demand to maintain a desired product purity and pressure, with power reduction and energy savings being achieved under turndown conditions.

16 Claims, 1 Drawing Sheet

PSA CYCLE CHART

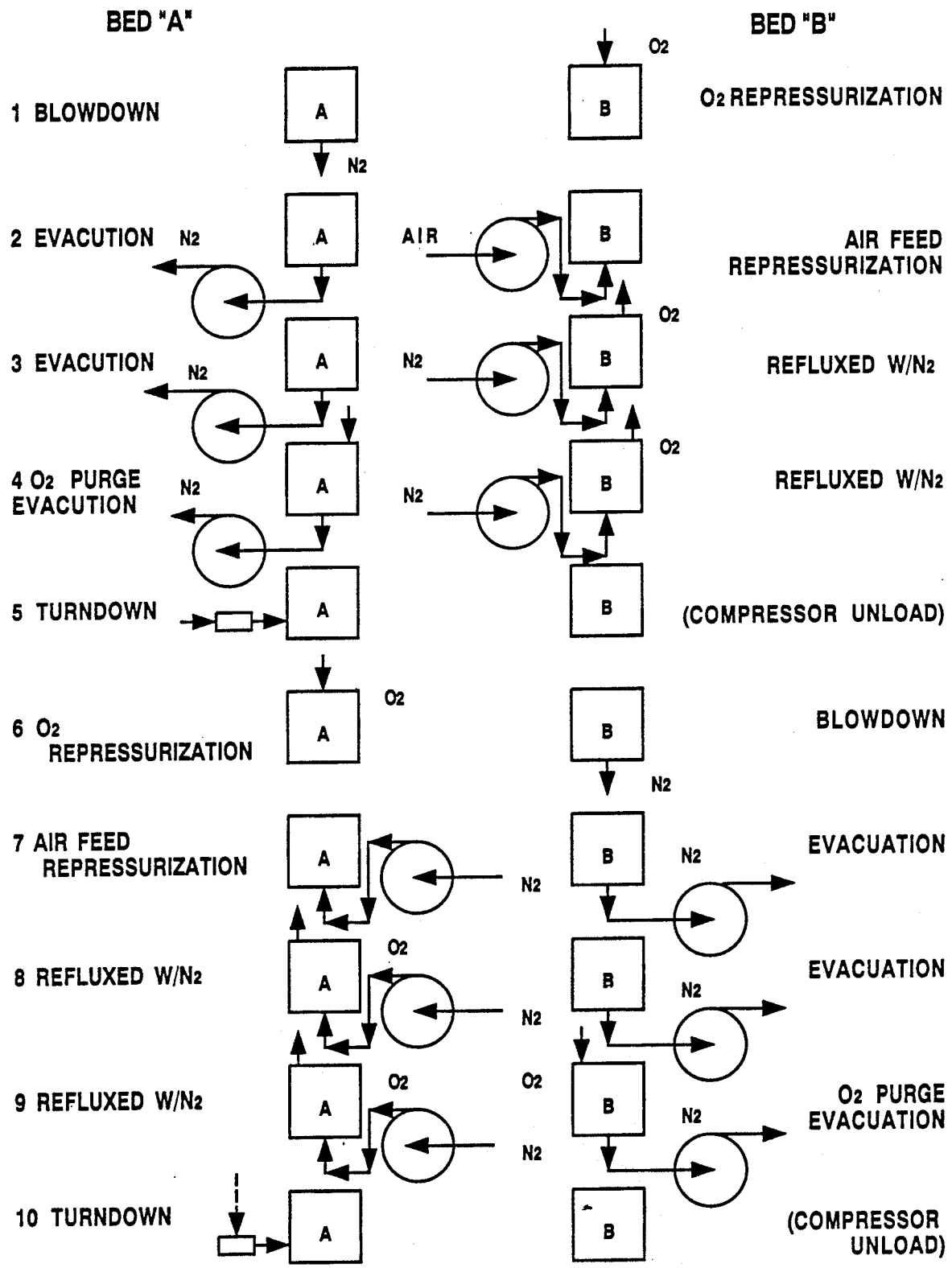

CONTROL OF PRESSURE SWING ADSORPTION OPERATIONS

BACKGROUND OF THE INVENTION

1. Field of the Invention The invention relates to pressure swing adsorption operations. More particularly, it relates to such operations under variable demand conditions.

2. Description of the Prior Art Pressure swing adsorption (PSA) processes and systems are well known in the art for achieving desirable separation of the components of a feed gas mixture. In the practice of the PSA process, a feed gas mixture containing a more readily adsorbable component and a less readily adsorbable component is passed to an adsorbent bed capable of selectively adsorbing the more readily adsorbable component at an upper adsorption pressure. The bed is thereafter depressurized to a lower desorption pressure for desorption of said more readily adsorbable component and its removal from said beds prior to the introduction of additional quantities of the feed gas mixture thereto as cyclic adsorption-desorption operations are continued in the PSA system. In conventional PSA practice, multi-bed systems are commonly employed, with each bed employing the PSA processing sequence on a cyclic basis interrelated to the carrying out of said sequence in the other beds of the system.

A highly advantageous application of the PSA technology relates to the separation of air to produce product nitrogen and co-product oxygen gas. For such operations, equilibrium type adsorbents, such as zeolite molecular sieves, are commonly employed and serve to selectively adsorb nitrogen as the more readily adsorbable component of air, while allowing oxygen to pass through the bed of adsorbent material as the less readily adsorbable component. A steady stream of nitrogen and oxygen of desired concentration can thus be produced.

While PSA processes and systems can readily be optimized for desired nitrogen and oxygen production under steady state conditions, the demand for such gaseous products does not remain constant over extended periods of time in various practical commercial applications. There is a need in the art for the development of PSA processes and systems suitable for operation under variable control conditions. Turndown control means are thus required so that the PSA systems can be operated efficiently so as to maintain desired product supply and purity under variable user demand conditions, while reducing power requirements under reduced demand conditions.

It is an object of the invention, therefore, to provide a PSA process and system for the production of nitrogen and oxygen from air under variable demand conditions.

It is another object of the invention to provide an improved PSA process and system for enhancing the efficiency of air separation operations under reduced nitrogen product gas conditions.

With these and other objects in mind, the invention is hereinafter described in detail, the novel features thereof being particularly pointed out in the appended claims.

SUMMARY OF THE INVENTION

A variable volume product storage vessel is monitored to determine variations in user demand and to control the sequencing of the processing steps in a PSA system used to produce product nitrogen and co-product oxygen under variable demand conditions.

BRIEF DESCRIPTION OF THE DRAWING

The invention is hereinafter described in detail with reference to the accompanying single FIG. drawing comprising a processing cycle chart for the operation of a two bed PSA system employing the turndown control feature of the invention for accommodating variable demand conditions.

DETAILED DESCRIPTION OF THE INVENTION

The objects of the invention are accomplished by utilizing a variable volume storage tank in combination with a PSA system, with a volume of flow therebetween to achieve the desired control of the PSA cycle in response to variable demand conditions.

In the pressure swing adsorption process of the invention, nitrogen product and oxygen co-product are produced by the selective adsorption of nitrogen from feed air in a PSA system having at least two adsorbent beds. Each adsorbent bed undergoes, on a cyclic basis, a processing sequence involving repressurization to upper adsorption pressure, reflux to displace unadsorbed oxygen co-product gas from the bed, blowdown and evacuation to lower desorption pressure to desorb and remove product nitrogen gas from the bed and to provide displacement gas for the refluxing of the bed at elevated pressure, purge and turndown, prior to repressurization and/or blowdown, as needed, to accommodate periods of reduced product demand.

With respect to the particular processing sequence illustrated in the drawing, a two bed PSA system is employed, with Bed A and Bed B each undergoing the indicated processing sequence, on a cyclic basis, with one bed being depressurized for the recovery of product nitrogen while the other bed is being repressurized for the selective adsorption of additional quantities of nitrogen from feed air and the recovery of oxygen co-product gas. The following description of the ten re-cited steps of the processing sequence in Bed A will thus be seen to pertain also with respect to Bed B on an appropriate cyclic basis as described. In step 1, high pressure nitrogen product is desorbed and withdrawn from the feed product (lower) end of Bed A to storage by the blowdown of said Bed A from its upper adsorption pressure level to an intermediate pressure level. The product gas flows from Bed A to a nitrogen storage tank, with the flow rate of gas being controlled at a safe level by the slow opening of the valve means in the conduit between the feed-product end of Bed A and said nitrogen storage tank.

Step 2 comprises the evacuation of Bed A from said intermediate pressure level to a lower level, under vacuum, to further desorb nitrogen from said Bed A and to withdraw said nitrogen as a low pressure nitrogen product from the feed-product end thereof. Such nitrogen can be passed to said nitrogen storage tank. The amount of nitrogen removed from Bed A during step 2 is held constant by controlling the duration of said step 2.

In step 3, evacuation of Bed A is continued with said Bed reaching its lower, subatmospheric desorption pressure, the nitrogen gas withdrawn from the feed-product end of Bed A during this step being recovered as low pressure nitrogen product. As in step 2, the amount of gas withdrawn from Bed A is held constant by controlling the duration of step 3. The nitrogen withdrawn is passed to said nitrogen storage tank or is passed to Bed B as reflux or displacement gas.

Additional quantities of nitrogen are withdrawn from the feed-product end of Bed A during step 4 in which oxygen purge gas is introduced into the purge-discharge (upper) end of Bed A. The nitrogen thus withdrawn can be passed to Bed B for use as reflux or displacement gas in said Bed B or can be passed to the nitrogen storage tank.

During turndown step 5, the processing sequence is on hold, with no gas, i.e. no feed gas, purge gas or reflux gas, being passed to Bed A and with no gas being withdrawn therefrom. The amount of nitrogen present in the nitrogen storage tank is monitored by suitable process computer/controller means, including associated volumetric measurement means. When reduced nitrogen usage rates, or any change in said rates, are observed, the computer/ controller means is adapted to automatically adjust the overall process cycle time and individual step times to correspond to the then-determined rate of nitrogen usage. The cycle time is increased in inverse proportion to the usage rate, i.e. the cycle time is increased as the usage rate decreases. The product nitrogen discharged from the nitrogen storage tank for downstream use is also monitored to assure that a constant purity nitrogen product is being supplied. The process computer/controller means is also adapted to assure that a constant pressure is provided in the nitrogen storage tank for constant pressure supply of the constant purity nitrogen product for downstream use. During turndown step 5, the compressor/vacuum pump means used to supply feed, purge and reflux gas, to the bed and to withdraw gas therefrom, are adjusted to reduce the power consumption of said compressor/vacuum means so as to achieve desirable energy savings in compressor power proportional to reduction in product demand rate.

Upon resumption of the processing sequence following turndown, step 6 provides for the passage of oxygen gas into Bed A from the purge-discharge end thereof for bed repressurization purposes. The process computer/controller means is adapted to cause oxygen to pass into the bed for a desired cycle time period consistent with the overall processing cycle time at any particular user demand level. During this repressurization step, no gas is typically discharged from Bed A.

In step 7, the repressurization of Bed A is continued by the introduction of fresh air to the bed at the feed-product end thereof. The quantity of feed air passed to Bed A during the step is controlled through the cycle control system means by a control of the time of this feed air repressurization step. During this repressurization step, it will be seen that no gas is discharged from the purge-discharge end thereof, and the bed is thus repressurized to its upper adsorption pressure level.

After Bed A has been repressurized to upper adsorption pressure by fresh air feed, with the selective adsorption of nitrogen therefrom, reflux or displacement nitrogen gas is passed to the bed at the feed-product end thereof, in step 8, to displace oxygen from the opposite, i.e. the purge-discharge, end thereof. The nitrogen gas used for this purpose can be withdrawn from the nitrogen storage tank or can be passed to Bed A from Bed B, as during the carrying out of said steps 1, 2 or 3 therein. The oxygen displaced from the bed during this step is stored in a suitable oxygen storage tank, typically at the highest available pressure.

In step 9 in Bed A, additional quantities of reflux or displacement nitrogen are passed to the feed-product end of said Bed A, with additional quantities of oxygen being displaced from the purge-discharge end thereof. The quantity of such displacement nitrogen added to Bed A during this step is controlled by the monitoring of the nitrogen gas storage inventory in the nitrogen storage tank and the use of the process computer/controller means to appropriately adjust the cycle time of said step 9. During this step, co-product oxygen gas is passed from the bed into suitable oxygen storage tanks, for use as co-product oxygen gas and for recycle as oxygen purge gas in step 4 as described above and/or as oxygen repressurization gas in step 6 as carried out in Bed A or Bed B.

Following said refluxing to displace oxygen from Bed A and before the withdrawal of product nitrogen therefrom in step 1 as the cyclic PSA processing sequence is repeated, step 10 comprises a turndown of the system, as in step 5 referred to above. Thus, no gas is either passed to Bed A, or discharged therefrom, during turndown step 10. The amount of nitrogen present in the nitrogen storage tank is monitored during this step by the process computer/controller means. When reduced nitrogen usage rate, or any change in said rates, are observed, the process computer/controller means is adapted to automatically adjust the PSA process cycle and step times to correspond to the then-determined rate of nitrogen usage. The nitrogen product stream supplied from the nitrogen storage tank for downstream use is desirably maintained at the desired product purity and pressure during times of reduced demand, while the power consumption of the compressor/vacuum means employed in the practice of the subject PSA process and system are reduced.

In the cyclic operation of the invention in the illustrated embodiment, it will be seen that Bed B undergoes the same processing sequence as is carried out in Bed A, with turndown step 10 occurring in Bed B at the same time as turndown step 5 occurs in Bed A. Likewise, turndown step 5 in Bed B occurs at the same time as turndown step 10 in said Bed A. It will be further observed that during steps 1–4 for the recovery of nitrogen product in Bed A, Bed B is undergoing steps 6–9 for the repressurization of the bed and the displacement of co-product oxygen therefrom. Similarly, Bed B undergoes steps 1–4 of the recited PSA processing sequence while Bed A is undergoing steps 6–9 thereof.

While the invention can be practiced conveniently in a two bed PSA system as described above, it will be appreciated that the invention can be practiced in PSA systems containing three or more adsorbent beds, if desired. In such instances, the desired processing sequence is carried out so that product nitrogen is continually recovered and passed to the nitrogen storage tank or to another bed for oxygen displacement purposes, except for the turndown steps corresponding to steps 5 and 10 of the illustrative cycle, during which time the compressor/ vacuum pump means are unloaded, and changes in nitrogen usage are determined by the process computer/controller means.

Those skilled in the art will appreciate that various modifications can be made in the details of the invention without departing from the scope of the invention as recited in the appended claims. Thus, any suitable, commercially available equilibrium-type adsorbent material capable of selectively adsorbing nitrogen as the more readily adsorbable component of feed air can be used in the practice of the invention. Preferred adsorbents include zeolitic molecular sieves, such as the type "X" zeolites, e.g. 13X, including such adsorbent material highly exchanged with monovalent cations, preferably lithium, or caustic digested type "X" materials.

While the process of the invention has been described in particular with respect to the illustrative embodiment using a particular blowdown, evacuation, repressurization, reflux sequence, it will be understood that any other processing sequence adapted to provide for the higher pressure adsorption - lower pressure desorption sequence, with appropriate turndown for monitoring changes in nitrogen usage demand, can also be employed. While two turndown steps are included in the illustrative processing sequence, the invention can be practiced in processing cycles including one or more such turndown steps in which changes in nitrogen product usage demand are determined. By the inclusion of more than one such turndown step in each processing cycle, the control method can be used more precisely to reduce power consumption, and achieve significant energy savings in the operation of the PSA process and system of the invention.

The process computer/controller employed in the practice of the invention can be any conventional, commercially available unit, including a conventional signal transmitter, programmed to send an output signal to control the passage of gases to and from Beds A and B in accordance with variations in nitrogen demand as determined by measurement of the amount of gas in the nitrogen storage tank, e.g. by volumetric measurement, and the sending of an input signal based thereon to said process computer/controller. As indicated above, the individual processing step times, and the overall PSA cycle time, are varied to efficiently match the production of nitrogen product to the demand therefor. Constant nitrogen product purity and pressure are effectively maintained, while operating costs are reduced by the reduction in power consumption of the compressor/vacuum means employed by the altering of the load time fractions of said compressor/vacuum means in response to variations in demand for product nitrogen. The invention thus enables the cycle step times to be adjusted between the times applicable for the desired processing sequence in the operation of the PSA system at design operating conditions and the times applicable at reduced demand conditions, while maintaining a desired nitrogen product purity level and achieving significant energy savings through the reduction of power consumption during reduced demand conditions.

The PSA process and system for air separation can generally be used to produce high purity nitrogen in the range of about 97-99.9%, and oxygen co-product in the 30-90% purity range, most typically in the 60-80% range. The higher pressure adsorption - lower pressure desorption cycle desirable operates between an upper adsorption pressure on the order of about 0-15 psig and a lower desorption pressure in the subatmospheric pressure range, typically about 2-8 psia, although other pressure levels can also be employed.

It will be appreciated that suitable temperature control means can be employed to assure that temperatures are controlled to assure maintenance of desirable adsorption bed operating conditions and to allow for consistent internal gas flow rates in the PSA system.

Turndown in the practice of the invention can be to the 5-10% level based on the design flow conditions in the PSA system. Typical efficiencies for turndown conditions have been observed to be on the order of 100% flow-100% power; 20% flow-30-40% power. During extended periods of no demand for product nitrogen, product purities are conveniently maintained by automatic cycling of the PSA system at a 5-10% load time fraction. Nitrogen gas recovered during this period of time can either be used as reflux or displacement gas or, if desired, can be vented from the system.

The nitrogen storage tank will generally receive wet nitrogen product gas, with conduit means being provided to enable accumulating water to be drained from the system. Nitrogen recovered from seal losses, instrument usage and reflux gas recycle can be returned through appropriate conduit means to the nitrogen storage tank, thereby minimizing undesired loss of product nitrogen in the overall operation of the PSA system. The process computer/controller automatically adapts to such changes in gas storage as determined by inputs from the gas storage inventory controller. While the nitrogen storage tank may be a fixed volume vessel, it is generally convenient, for purposes of the invention, to employ a variable volume nitrogen storage vessel. For this purpose, a flexible liner adapted for volume change in response to the volume of gas present in the vessel may be inserted into the nitrogen storage vessel. Such a liner may be made of a suitable material, such is fiber reinforced polymeric material, having desirable strength and permeability characteristics under the intended operating conditions.

The invention will be seen to provide a highly desirable and useful improvement in PSA technology for air separation. By enabling PSA processes and systems to be efficiently operated under turndown conditions during periods of reduced demand for product nitrogen, the invention enables PSA technology to more effectively accommodate the variable demand conditions often encountered in practical industrial applications for high purity nitrogen and co-product oxygen.

I claim:

1. In a pressure swing adsorption process for the production of nitrogen product for delivery to a variable demand downstream usage, with production of co-product oxygen, said products being produced in a pressure swing adsorption system containing at least two adsorbent beds capable of selectively adsorbing nitrogen as the more readily adsorbable component of feed air, each bed undergoing, on a cyclic basis, a processing sequence comprising passing feed air to the bed for the selective adsorption of nitrogen at an upper adsorption pressure, and depressurization of said bed to a lower desorption pressure for desorption of nitrogen and the recovery thereof from said bed, the improvement comprising:

(a) passing nitrogen recovered from said bed to a nitrogen storage vessel for delivery to said variable demand downstream usage of said nitrogen;

(b) providing a turndown period in the processing sequence in each bed, no gas being passed to, or withdrawn from, the bed during said turndown period, the turndown period occurring at the same time in each bed;

(c) monitoring the amount of nitrogen present in the nitrogen storage vessel during said turndown period to determine variations in the nitrogen demand;

(d) adjusting the overall cycle time, and individual processing step times for the processing sequence between the times applicable for the production of nitrogen at a desired purity level at design operation conditions and the times for the production of nitrogen at essentially the same purity level under reduced demand conditions; and (e) reducing the amount of power consumed by the pressure swing adsorption system in response to said reduced demand conditions, whereby the process can be operated for the production of constant purity nitrogen product under variable demand conditions, with a significant reduction in power consumption during reduced demand operation.

2. The process of claim 1 in which said nitrogen storage vessel is a variable volume vessel.

3. The process of claim 2 in which said nitrogen product is produced in a two bed pressure swing adsorption system.

4. The process of claim 3 in which the sequence in each bed includes two turndown periods, one prior to the commencement of repressurization of each bed from its lower desorption pressure and the other prior to depressurization thereof from its upper adsorption pressure, the turndown period prior to repressurization in one bed coinciding in time with the turndown period prior to depressurization in the other bed.

5. The process of claim 4 in which said lower desorption pressure comprises a subatmospheric desorption pressure.

6. The process of claim 4 in which the processing sequence in each bed of the pressure swing adsorption system, on a cyclic basis, comprises (a) blowndown from upper adsorption pressure to an intermediate pressure level, with withdrawal of nitrogen from the feed-product end of the bed; (b) evacuation of the bed to a lower subatmospheric pressure level, with further withdrawal of nitrogen from said feed-product end of the bed; (c) continued evacuation of the bed to a subatmospheric desorption pressure level; (d) purge by the addition of co-product oxygen to the purge-discharge end of the bed, with the withdrawal of additional quantities of nitrogen from the feed-product end of the bed; (e) turndown with no gas being passed to, or withdrawn from, the bed; (f) repressurization of the bed from its lower desorption pressure to an intermediate pressure by the passage of co-product oxygen to the purge-discharge end thereof; (g) further repressurization from intermediate pressure to the upper adsorption pressure by the passage of feed air to the feed-product end of the bed, nitrogen present in said feed air being selectively adsorbed by the adsorbent bed; (h) reflux of the bed by the passage of nitrogen to the feed-product end of the bed to displace unadsorbed oxygen from the purge-discharge end of the bed; (i) further reflux of the bed and passage of co-product oxygen to an oxygen storage vessel; and (j) turndown with no gas being passed to, or withdrawn from, the bed, with step (i) in one bed coinciding in time with step (j) in the other bed.

7. The process of claim 2 in which said lower desorption pressure comprises a subatmospheric desorption pressure.

8. The process of claim 1 in which said nitrogen product is produced in a two bed pressure swing adsorption system.

9. The process of claim 1 in which said lower desorption pressure comprises a subatmospheric desorption pressure.

10. In a pressure swing adsorption system for the production of nitrogen product for delivery to a variable demand downstream usage, with production of co-product oxygen, said system containing at least two adsorbent beds capable of selectively adsorbing nitrogen as the more readily adsorbable component of feed air, each bed undergoing, on a cyclic basis, a processing sequence comprising passing feed air to each bed for the selective adsorption of nitrogen at an upper adsorption pressure, and depressurization of each bed to a lower desorption pressure for desorption of nitrogen and the recovery thereof from said bed, the improvement comprising:

(a) a nitrogen storage vessel for the delivery of nitrogen product recovered in said system at a constant purity level to said variable demand downstream usage of said nitrogen;

(b) turndown means for interrupting the processing sequence in each bed, so that no gas is passed to, or withdrawn from, either bed during a turndown period, such said turndown period occurring at the same time in each bed;

(c) monitoring means for determining the amount of nitrogen present in said nitrogen storage vessel to determine variations in nitrogen demand;

(d) control means for adjusting the time period for the processing sequence in each bed, and the amount of time for each portion thereof between the times applicable for the production of nitrogen at a desired purity level at design operating conditions and said times for the production of nitrogen at essentially the same purity level under reduced demand conditions; and (e) means for reducing the amount of power consumed by the pressure swing adsorption system in response to said reduced demand conditions, whereby the system can be operated for the production of constant purity nitrogen product under variable demand conditions, with a significant reduction in power consumption during reduced demand operation.

11. The system of claim 10 in which said nitrogen storage vessel is a variable volume vessel.

12. The system of claim 11 in which said system comprises two adsorbent beds.

13. The system of claim 10 in which said system comprises two adsorbent beds.

14. The system of claim 10 in which said turndown means is adapted to provide two turndown periods, one from the commencement of repressurization of each bed from its lower desorption pressure and the other prior to depressurization from its upper adsorption pressure, the turndown period prior to repressurization in one bed coinciding in time with the turndown period prior to depressurization in the other bed.

15. The system of claim 14 in which said nitrogen storage vessel is a variable volume vessel, said system comprising two adsorbent beds.

16. The system of claim 10 and including vacuum means for depressurizing said beds to a subatmospheric lower desorption pressure.

* * * * *